April 10, 1928.
W. L. NEWMEYER
CIRCUIT INTERRUPTER
Filed July 11, 1924
1,665,858
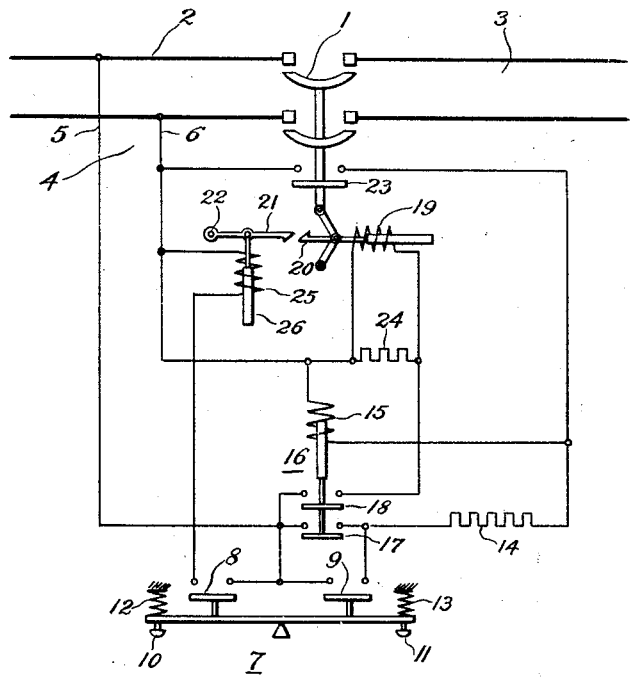
WITNESSES:
INVENTOR
William L. Newmeyer
BY
ATTORNEY Patented Apr. 10, 1928.

1,665,858

UNITED STATES PATENT OFFICE.

WILLIAM L. NEWMEYER, OF WILKINSBURG, PENNSYLVANIA, ASSIGNOR TO WESTINGHOUSE ELECTRIC & MANUFACTURING COMPANY, A CORPORATION OF PENNSYLVANIA.

CIRCUIT INTERRUPTER.

Application filed July 11, 1924. Serial No. 725,347.

My invention relates to circuit interrupters and particularly to electrically operated circuit interrupters of the latching type.

One object of my invention is to provide a latching type of electrically operated circuit interrupter in which the closing coil is de-energized when the interrupter is latched in its closed position.

Another object of my invention is to provide a circuit interrupter, of the above-indicated character, in which the maintaining of the energization of the closing coil is assured until the interrupter is latched in its closed position.

Another object of my invention is to provide a circuit interrupter, of the above-indicated character, in which a discharge circuit is provided in parallel relation with the closing coil for the purpose of maintaining the magnetic action of the closing coil for a short interval of time after the energizing circuit thereof is interrupted.

In practicing my invention, I provide a circuit interrupter, a closing coil therefor, a latching device for holding the interrupter in its closed position, and a tripping coil for releasing the latching device to permit the circuit interrupter to return to its open position.

I further provide a source of electrical energy for energizing the closing and tripping coils of the circuit interrupter and a manually operated switch and an electrically operated relay device for controlling such energization. The manually operated switch, when operated to close the circuit interrupter, effects energization of the relay device, which in turn completes a circuit for energizing the closing coil of the circuit interrupter. The circuit interrupter is thereupon closed and latched in position, and the relay device is de-energized to interrupt the circuit for energizing the closing coil. The circuit interrupter then remains closed until the manually operated switch is operated to cause the interrupter to be opened. This result is accomplished by energizing the trip coil of the latching device to release the same and thereby permit the circuit interrupter to open.

The single figure of the accompanying drawings is a diagrammatic representation of the apparatus and circuits embodying my invention.

Referring to the drawing, a circuit interrupter 1 is connected between two circuits 2 and 3 of an electrical system. It will be assumed that one of these circuits is a supply circuit and the other a distribution circuit, and for convenience the circuit 2 will be referred to hereafter as the supply circuit and the circuit 3 as the distribution circuit. A control circuit 4, comprising conductors 5 and 6, is connected in parallel relation with the supply circuit 2 and provides electrical energy for operating various controlling devices which will be described presently.

A manually operated switching device 7 is provided for controlling the operation of the circuit interrupter 1. The switching device 7 is provided with two switches 8 and 9, two push-buttons 10 and 11, and two springs 12 and 13. The springs 12 and 13 normally hold the switching device 7 in the neutral position, as shown in the drawing, in which switches 8 and 9 are both open. When it is desired to close the switch 8, the push-button 10 is depressed, and when it is desired to close the switch 9, the push-button 11 is depressed.

Assuming that the circuit interrupter 1 is in its open position, as shown, and that it is desired that it be actuated to its closed position, the push-button 11 of the switching device 7 is depressed to close the switch 9. A circuit is thereby completed from the conductor 5 of the control circuit 4 through the switch 9, a resistor 14, and the operating coil 15 of a relay device 16 to the conductor 6 of the control circuit 4. The coil 15 is thereupon energized from the control circuit 4 to effect closing of two switches 17 and 18 of the relay device 16. The switch 17 so shunts the switch 9 as to maintain energization of the operating coil 15 of the relay device 16 after the switch 9 is opened.

The closing of the switch 18 of the relay device 16 completes a circuit for connecting a closing coil 19 of the circuit interrupter 1 across the control circuit 4. The closing coil 19 is thereupon energized to actuate the circuit interrupter 1 to its closed position. When the circuit interrupter 1 is actuated to its closed position, a latching member 20 that is mounted on the closing mechanism of the circuit interrupter engages a latching member 21 that is pivotally mounted on a fixed pivot 22.

It is desired that when the interrupter 1 is closed and latched the closing coil 19 be immediately de-energized, since the closing coil of a large circuit interrupter consumes a considerable amount of energy and continued energization thereof is undesirable, both on account of its energy consumption and on account of the damaging effect of continued heavy currents traversing the control circuits. The engagement of the latching members 20 and 21 must be assured, however, before the coil 19 is de-energized, as otherwise the circuit interrupter would immediately return to its open position.

In the past, it has been common practice to provide a pallet switch or other device having a delayed operation associated with a circuit interrupter for the purpose of de-energizing the closing coil thereof when the interrupter is latched in its closed position. In the present invention, however, I provide means for eliminating such delayed-action device and provide only a simple auxiliary interlocked switch 23 that is associated with the circuit interrupter.

When the circuit interrupter 1 is actuated to its closed position, the auxiliary interlock switch 23 is closed to complete a short circuit between the terminals of the operating coil 15 of the switching device 16. The coil 15 is thus de-energized to permit the switching device 16 to return to its open position, in which the switches 17 and 18 are open. The coil 15 is not de-energized instantaneously, since it is short-circuited rather than open-circuited by the closing of the circuit interrupter 1. Therefore the induced current which traverses the coil 15 after the circuit interrupter 1 is closed, will maintain its energization for a short interval of time. When the switch 18 is opened, the circuit for energizing the closing coil 19 of the circuit interrupter 1 is interrupted.

With the ordinary type of circuit interrupter such immediate interruption of the circuit of its closing coil would permit the circuit interrupter to return to its open position before it became latched in its closed position. In order to preclude this operation, I provide a resistor 24 that is permanently connected in parallel relation with the closing coil 19 of the interrupter 1.

The resistor 24 constitutes a discharge circuit for the coil 19, with the result that the inductive effect of the coil 19 causes the current traversing this coil to diminish slowly after its energizing circuit is interrupted. This induced current which traverses the coil 19 after the energizing circuit thereof is interrupted continues for a sufficient interval of time to permit the latching members 20 and 21 to be engaged. Thus, the complete de-energization of the closing coil 19 is delayed because circuits are provided whereby induced currents may traverse both the operating coil 15 of the relay 16 and the closing coil 19 of the interrupter 1. Latching of the interrupter in its closed position is therefore assured before its closing coil is completely de-energized.

The circuit interrupter 1 may be opened by depressing the push-button 10 of the switching device 7 to close the switch 8. When the switch 8 is thus closed, a tripping coil 25 of the circuit interrupter 1 is connected across the control circuit 4 and is energized therefrom. When the trip coil 25 is energized, its armature member 26 is raised to actuate the latching member 21 out of engagement with the latching member 20. The circuit interrupter 1 is thereupon permitted to return to its open position.

The circuit interrupter and the controlling devices that are associated therewith are now in the same condition as originally described and are ready to respond to the operation of the switching device 7 to close or open the interrupter as desired.

From the above description, it will be seen that I have obviated the necessity for providing any mechanical device for delaying the de-energization of the closing coil of the circuit interrupter to permit the interrupter to be latched in its closed position. I accomplish such delay by providing a discharge circuit that is connected in parallel relation with the closing coil, by means of which the energization of the closing coil is maintained by induced current after its energizing circuit is interrupted, and also by close-circuiting the operating coil of the relay device which controls the energization of the closing coil of the circuit interrupter, thereby also providing a path for induced current to traverse the coil of this relay and maintain energization thereof for a short interval of time.

The interval of time during which energization of the closing coil shall be maintained after its energizing circuit is interrupted is determined by the value of the resistance of the discharge circuit and the inductive characteristics of the closing coil. It has been found, by experiment, that this time interval may be adjusted to any desired value and may be made far in excess of the time required for latching the interrupter in its closed position.

I do not limit my invention to the specific details of structure and circuits illustrated in the drawings and described in the foregoing specification, as many changes may be made therein without departing from the spirit and scope of my invention as set forth in the appended claims.

I claim as my invention:

1. The combination with a circuit interrupter, a closing coil therefor, a resistor connected in parallel relation with the closing coil, and a source of electrical energy, of a relay device for connecting the closing coil to the source of energy, a switch for connecting the relay device to the source of energy, an auxiliary switch associated with the relay device for maintaining connection between the relay device and the source of energy, and means associated with the circuit interrupter for rendering the relay device ineffective.

2. The combination with a circuit interrupter, a closing coil therefor, a resistor connected in parallel relation with the closing coil, and a source of electrical energy, of a relay device for connecting the closing coil to the source of energy, a switch for connecting the relay device to the source of energy, an auxiliary switch associated with the relay device for maintaining connection between the relay device and the source of energy, and means associated with the circuit interrupter for rendering the relay device ineffective when the circuit interrupter is actuated to its closed position.

3. The combination with a circuit interrupter, a closing coil therefor, a resistor connected in parallel relation with the closing coil and a source of electrical energy, of a relay device for connecting the closing coil to the source of energy, a switch for connecting the relay device to the source of energy, an auxiliary switch associated with the relay device for maintaining connection between the relay device and the source of energy, and an auxiliary switch associated with the circuit interrupter for short-circuiting the relay device.

4. The combination with a circuit interrupter, a closing coil therefor, a resistor connected in parallel relation with the closing coil, and a source of electrical energy, of a relay device for connecting the closing coil to the source of energy, a switch for connecting the relay device to the source of energy, an auxiliary switch associated with the relay device for maintaining connection between the relay device and the source of energy, and means associated with the circuit interrupter for rendering the relay device ineffective in a predetermined interval of time after the circuit interrupter is actuated to its closed position.

5. The combination with a circuit interrupter, a closing coil therefor, a resistor connected in parallel relation with the closing coil, and a source of electrical energy, of a relay device for connecting the closing coil to the source of energy, a switch for connecting the relay device to the source of energy, an auxiliary switch associated with the relay device for maintaining connection between the relay device and the source of energy, and means associated with the circuit interrupter for rendering the relay device ineffective in a short interval of time after the circuit interrupter is actuated to its closed position.

In testimony whereof, I have hereunto subscribed my name this 7th day of July, 1924.

WILLIAM L. NEWMEYER.